United States Patent
Roth et al.

(10) Patent No.: US 9,545,165 B2
(45) Date of Patent: *Jan. 17, 2017

(54) FOOD STORAGE SYSTEM

(71) Applicant: COOL GEAR INTERNATIONAL LLC, Plymouth, MA (US)

(72) Inventors: Donna Roth, Duxbury, MA (US); Henry Roth, Plymouth, MA (US)

(73) Assignee: Cool Gear International, LLC, Plymouth, MA (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/274,181

(22) Filed: May 9, 2014

(65) Prior Publication Data
US 2014/0246443 A1    Sep. 4, 2014

Related U.S. Application Data

(63) Continuation of application No. 13/225,351, filed on Sep. 2, 2011, now Pat. No. 8,720,223, which is a continuation of application No. 12/046,498, filed on Mar. 12, 2008, now Pat. No. 8,011,205, which is a continuation-in-part of application No. 11/022,705, filed on Dec. 27, 2004, now Pat. No. 7,380,412, which is a continuation-in-part of application No. 29/215,246, filed on Oct. 15, 2004, now Pat. No. Des. 526,161, and a continuation-in-part of application No. 29/215,245, filed on Oct. 15, 2004, now Pat. No. Des. 527,952, and a continuation-in-part of application No. 29/211,946, filed on Aug. 24, 2004, now Pat. No. Des.

(Continued)

(51) Int. Cl.
*A47G 19/02*    (2006.01)
*A47J 41/00*    (2006.01)
*B65D 77/04*    (2006.01)
*B65D 81/18*    (2006.01)
*F25D 3/08*    (2006.01)
*A47J 47/14*    (2006.01)
*B65D 81/34*    (2006.01)
*F25D 31/00*    (2006.01)

(52) U.S. Cl.
CPC ............. *A47G 19/027* (2013.01); *A47G 19/02* (2013.01); *A47J 41/0044* (2013.01); *B65D 77/0493* (2013.01); *B65D 81/18* (2013.01); *B65D 81/3484* (2013.01); *F25D 3/08* (2013.01); *A47J 47/14* (2013.01); *B65D 81/3453* (2013.01); *F25D 31/005* (2013.01); *F25D 2303/0831* (2013.01); *F25D 2331/804* (2013.01)

(58) Field of Classification Search
CPC .................................................... A47G 19/027
See application file for complete search history.

(56) References Cited

U.S. PATENT DOCUMENTS

| | | | | |
|---|---|---|---|---|
| 1,038,098 A | * | 9/1912 | Decker | A47G 19/027 220/574.2 |
| 4,848,579 A | * | 7/1989 | Barnes | A47J 36/027 206/499 |

(Continued)

*Primary Examiner* — Emmanuel Duke
(74) *Attorney, Agent, or Firm* — Mintz Levin Cohn Ferris Glovsky and Popeo, P.C.; Steven M. Jensen; Richard B. Emmons

(57) ABSTRACT

A food storage system including a secondary bowl that is adapted to be positioned at least partially on and/or in a main lid. The secondary bowl is adapted to be detachable from the main lid.

18 Claims, 22 Drawing Sheets

Related U.S. Application Data 527,951, and a continuation-in-part of application No. 29/210,681, filed on Aug. 4, 2004, now Pat. No. Des. 536,922, and a continuation-in-part of application No. 29/210,423, filed on Jul. 30, 2004, now Pat. No. Des. 527,224, and a continuation-in-part of application No. 29/210,422, filed on Jul. 30, 2004, now Pat. No. Des. 536,923, and a continuation-in-part of application No. 29/210,287, filed on Jul. 29, 2004, now Pat. No. Des. 527,954, and a continuation-in-part of application No. 29/209,746, filed on Jul. 21, 2004, now Pat. No. Des. 511,435.

(60) Provisional application No. 60/894,444, filed on Mar. 12, 2007.

(56) References Cited

U.S. PATENT DOCUMENTS

| | | | | |
|---|---|---|---|---|
| 5,520,014 | A | * | 5/1996 | Laugier ............... A23G 9/08 62/457.2 |
| 5,894,953 | A | * | 4/1999 | Ramirez ............ B65D 21/0233 206/508 |
| 5,940,974 | A | * | 8/1999 | Lee ..................... A47G 21/02 30/322 |
| 2004/0035867 | A1 | * | 2/2004 | Schultz ............. B65D 43/0204 220/212 |
| 2004/0112368 | A1 | * | 6/2004 | Amico ............... A47J 41/0044 126/273.5 |
| 2007/0095828 | A1 | * | 5/2007 | Schapiro ........... B65D 77/0493 220/23.83 |

* cited by examiner

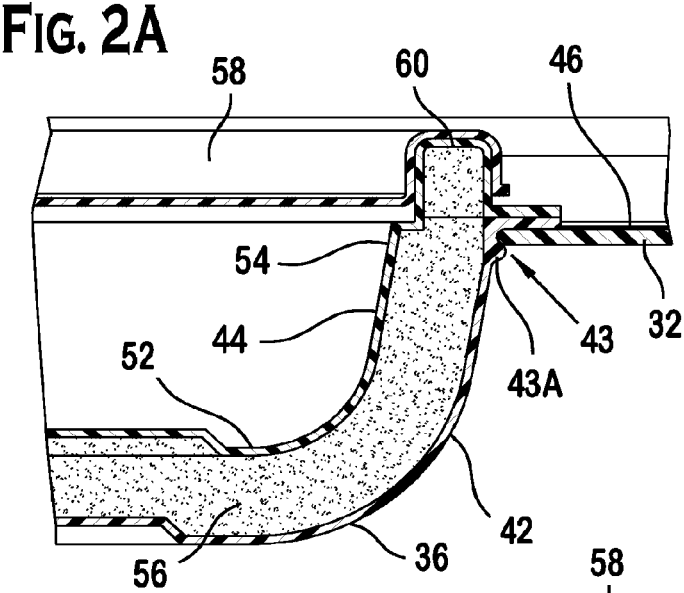
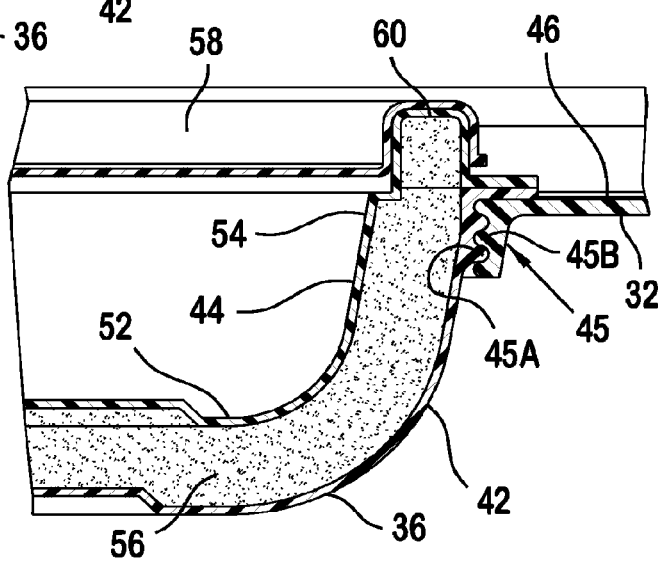
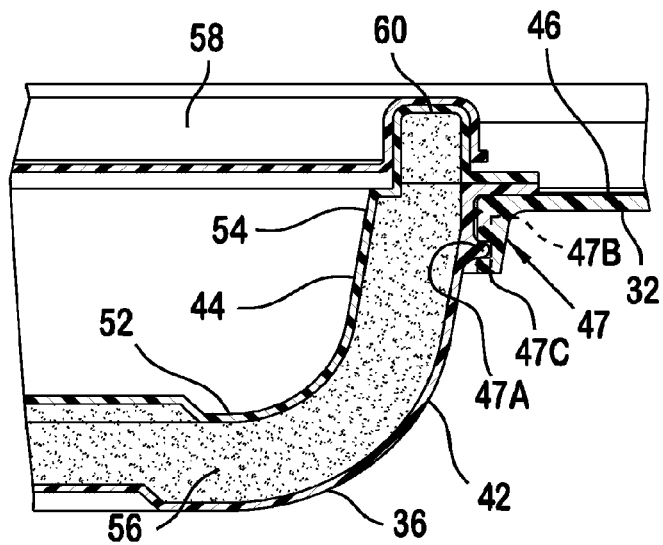

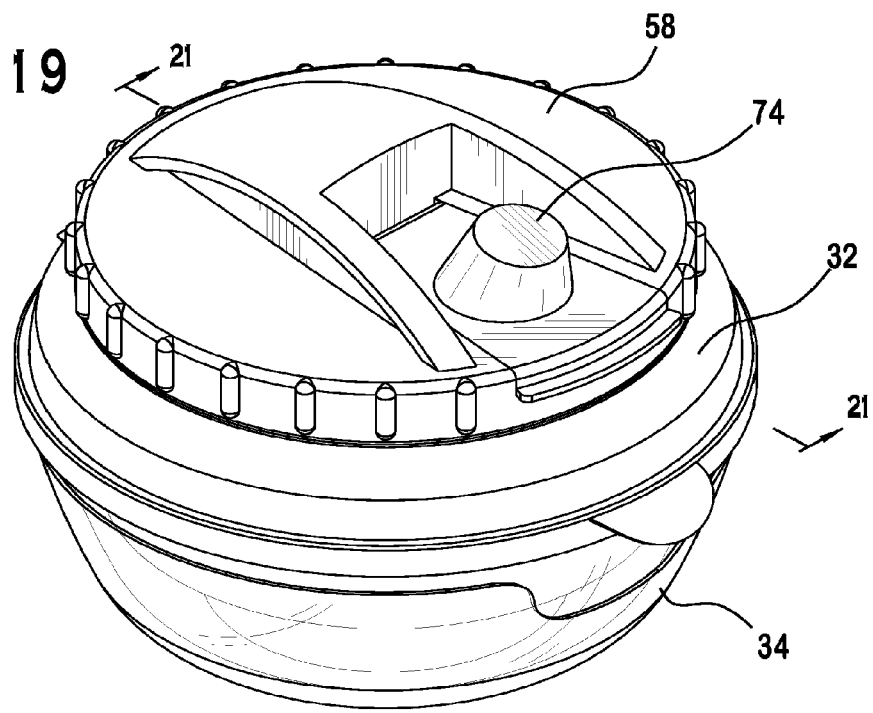
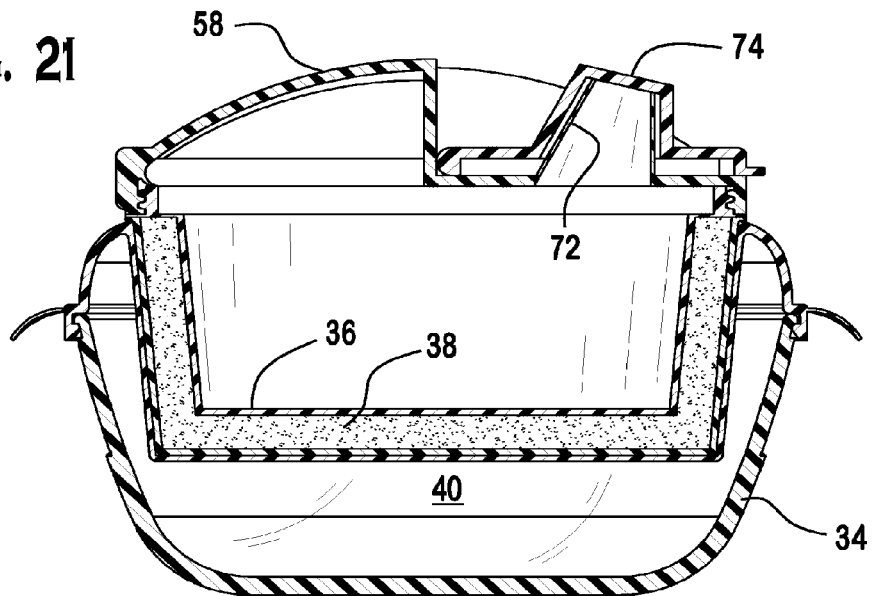

FOOD STORAGE SYSTEM

CROSS REFERENCE TO RELATED APPLICATIONS

This application is a continuation of U.S. patent application Ser. No. 13/225,351, filed Sep. 2, 2011 and issuing as U.S. Pat. No. 8,720,223 on May 13, 2014, which claims priority to and is a continuation of U.S. patent application Ser. No. 12/046,498, filed Mar. 12, 2008 and issued as U.S. Pat. No. 8,011,205 on Sep. 6, 2011, which claims priority to and the benefit of U.S. Provisional Patent Application 60/894,444, filed Mar. 12, 2007, and is a continuation in part of U.S. patent application Ser. No. 11/022,705, filed Dec. 27, 2004. Priority to each of the above-identified patent applications is claimed and each of the above identified patent applications is incorporated by reference herein as if fully set forth herein in their entireties.

BACKGROUND

The present invention is generally directed to food containers and, more specifically, to containers that provide easy storage and transport of food.

Conventional food storage containers are configured to hold a single type of food. This can be disadvantageous when separate foods are to be transported due to the difficulty in packing, loading, and transporting multiple containers for use at a single meal.

It may be advantageous to provide a food storage system that is preferably adapted to allow different foods to be transported without using multiple separate, detached containers.

SUMMARY

Briefly speaking, one preferred embodiment of the present invention is directed to a food storage system including a main bowl defining a first food receiving cavity. A main lid is detachably engageable with the main bowl. A secondary bowl is positioned at least partially on and/or in the main lid. The secondary bowl is detachable from the main lid. The secondary includes thermal energy storage material therein and defines a second food receiving cavity. The food storage system can separately hold food items in the first or second food receiving cavities. The secondary bowl is configured so that the thermal energy storage material can heat and/or cool food contained in the second food receiving cavity.

In a separate aspect, the present invention is directed to a food storage system including a main lid adapted for detachable engagement with a main bowl. A secondary bowl is positioned at least partially on and/or in the main lid. The secondary bowl is detachable from the main lid. The secondary bowl includes thermal energy storage material therein and defines a second food receiving cavity. The food storage system is adapted to hold food items in the second food receiving cavity. The secondary bowl is configured so that the thermal energy storage material is adapted to heat and/or cool food contained in the second food receiving cavity.

In a separate aspect, the present invention is directed to a food storage system including a main bowl defining a first food receiving cavity. A main lid is detachably engageable with the main bowl. A secondary bowl is positioned at least partially on and/or in the main lid. The secondary bowl is detachable from the main lid. The secondary bowl can separately hold food items in the first and second food receiving cavities.

BRIEF DESCRIPTION OF THE DRAWINGS

The foregoing summary, as well as the following description of the preferred embodiments of the present invention, will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 2A is a partial cross-sectional view of the food storage system of FIG. 2 and illustrates the secondary bowl being snap fit to the main lid; a lip extends around the secondary bowl that is pressed through a hole in the main lid to allow the secondary bowl to be detachably engageable with the main lid; a secondary lid is engaged with the secondary bowl;

FIG. 2B is a partial cross-sectional view of the food storage system of FIG. 2 and illustrates the secondary bowl being threaded to the main lid; at least one thread extends around the secondary bowl that is detachably engageable with at least one thread that is positioned along an inner surface of a downwardly depending lid member; a secondary lid is engaged with the secondary bowl;

FIG. 2C is a partial cross-sectional view of the food storage system of FIG. 2 and illustrates the secondary bowl being twist locked to the main lid; a lip extends around the secondary bowl that is slid through a slot and then rotated to detachably secure the secondary bowl to the main lid; a secondary lid is engaged with, the secondary bowl;

FIG. 19 is a perspective view of the detached secondary bowl of the food storage system of FIG. 18;

FIG. 21 is cross-sectional view of the detached secondary bowl of FIG. 18 as taken along the line 21-21 in FIG. 18.

DETAILED DESCRIPTION OF THE PREFERRED EMBODIMENTS

Figure 1:
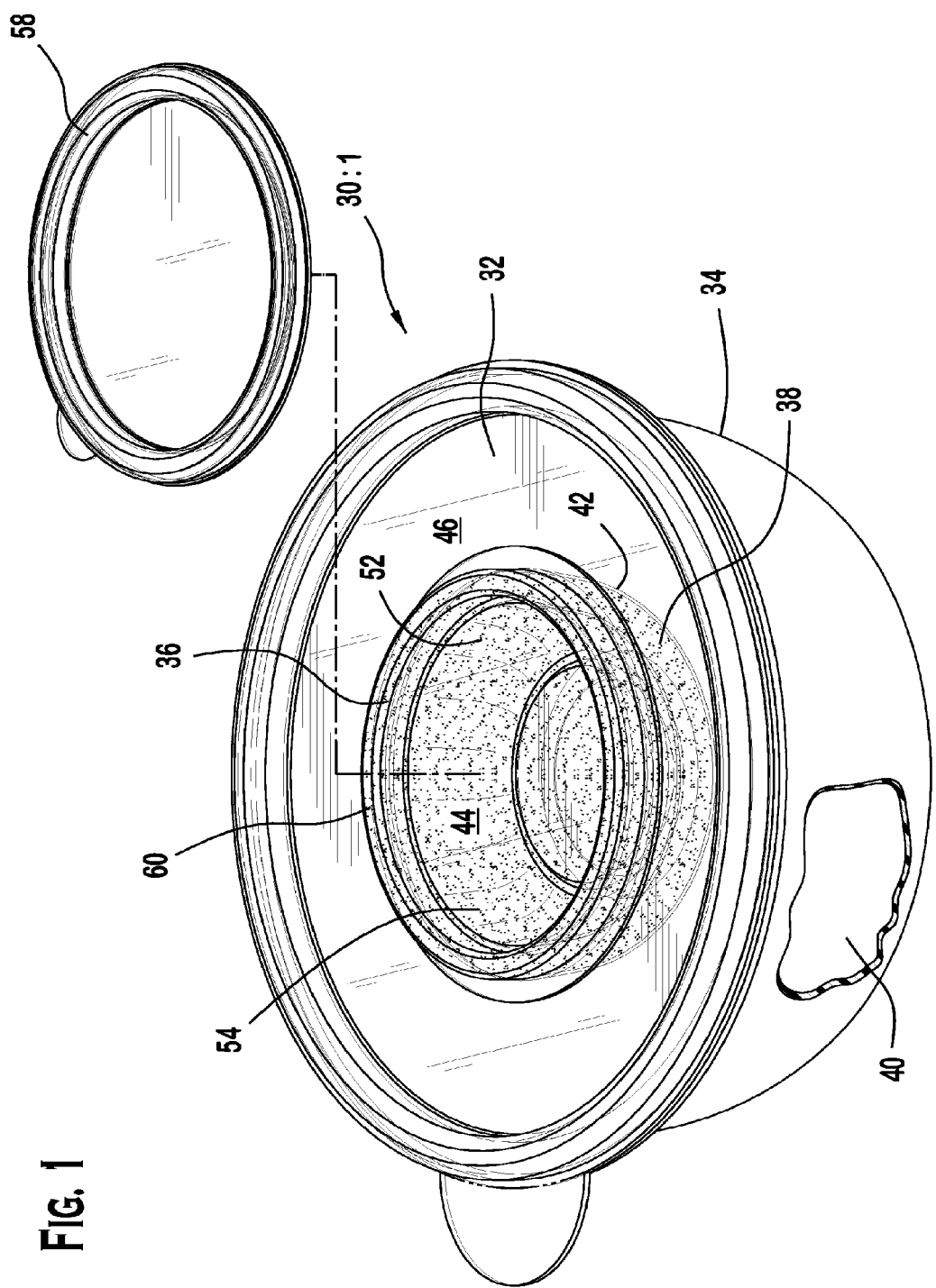
FIG. 1 is a perspective view of a first preferred embodiment of the two part container of the present invention; the food storage system is formed by a main lid having a secondary bowl positioned therein; the secondary bowl includes a sidewall having thermal energy storage material therein.
Figure 2:
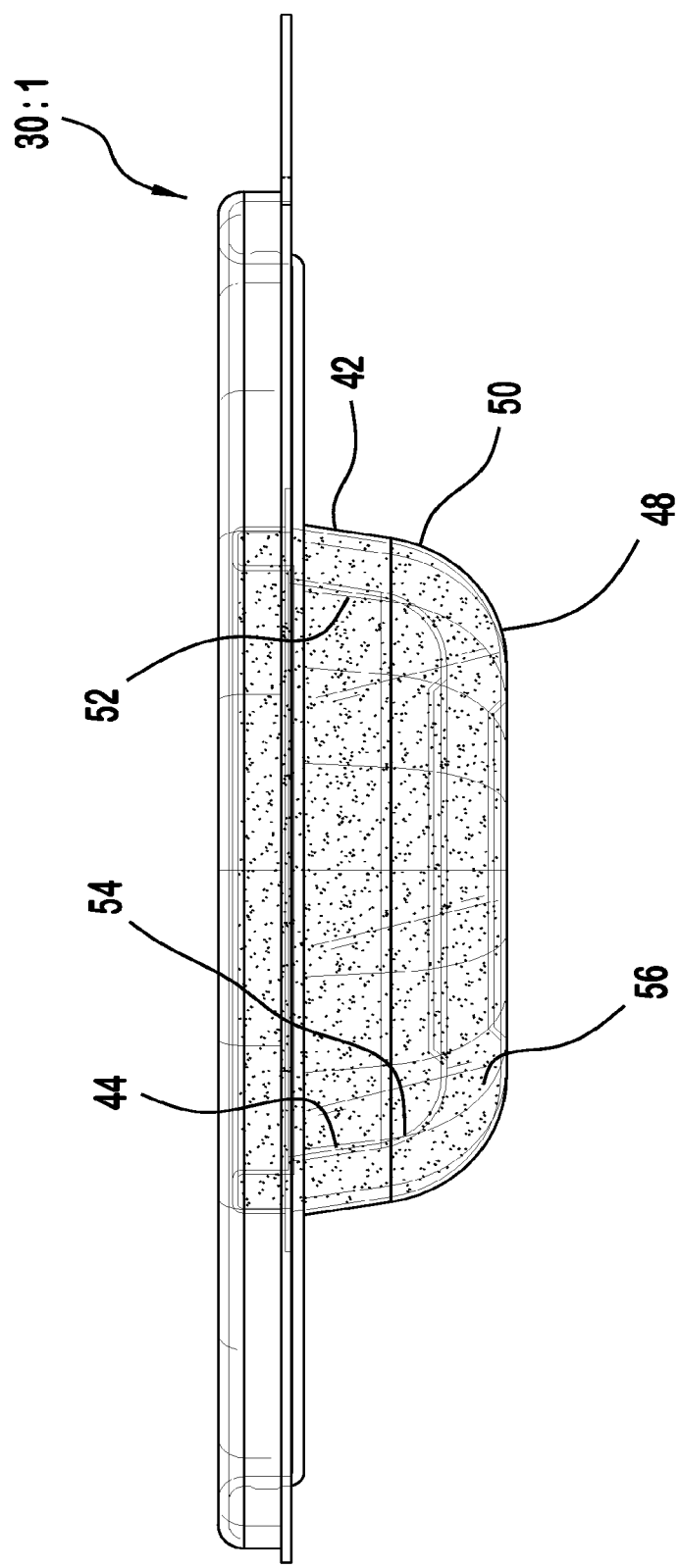
FIG. 2 is an elevational view of the food storage system of FIG. 1.
Figure 3:
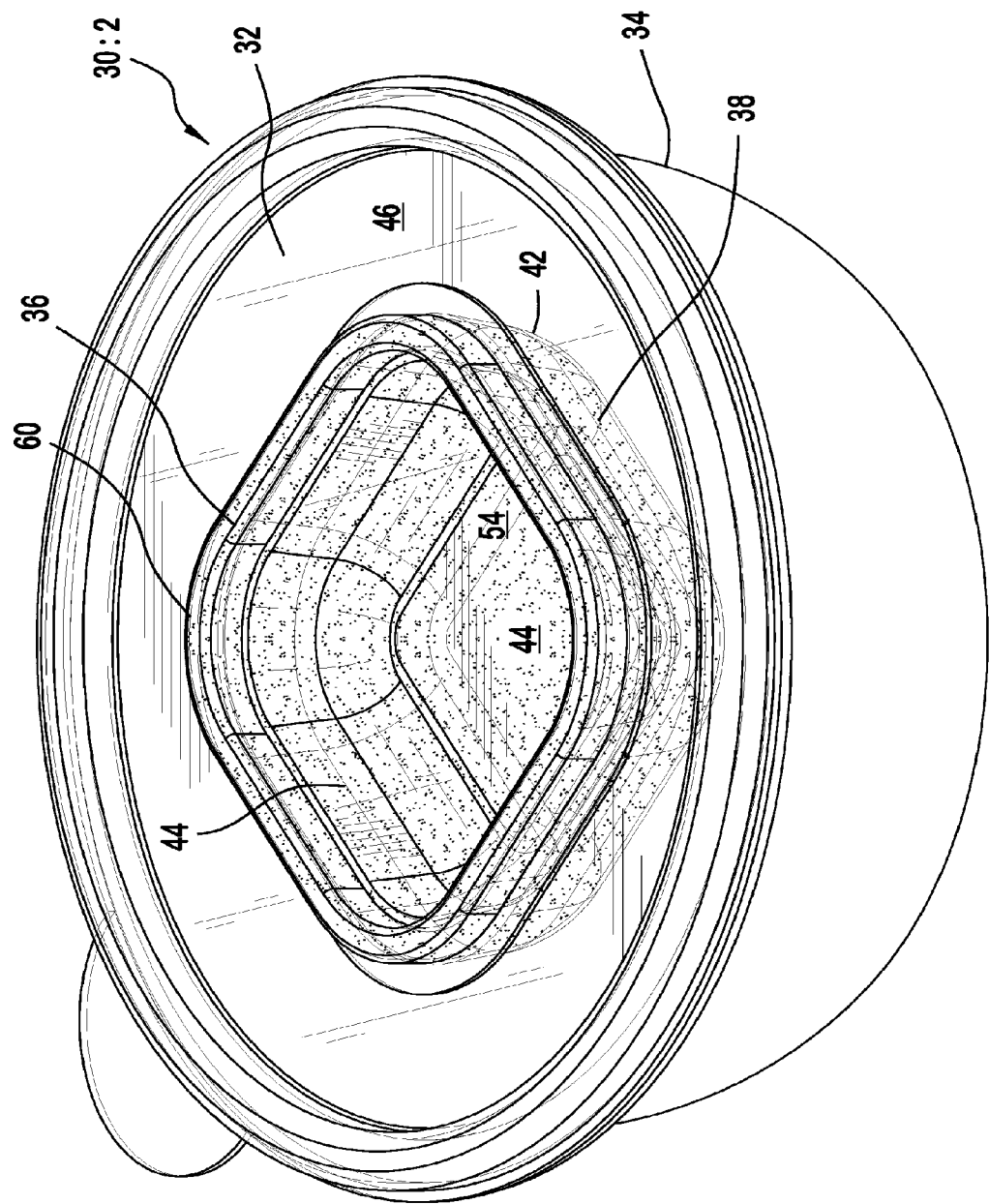
FIG. 3 is a perspective view of a second preferred embodiment of the food storage system of the present invention; the food storage system includes a main lid having a secondary bowl therein that includes thermal energy storage material in the second bowl sidewalls; the main lid is circularly shaped and the secondary bowl is generally rectilinearly shaped.
Figure 4:
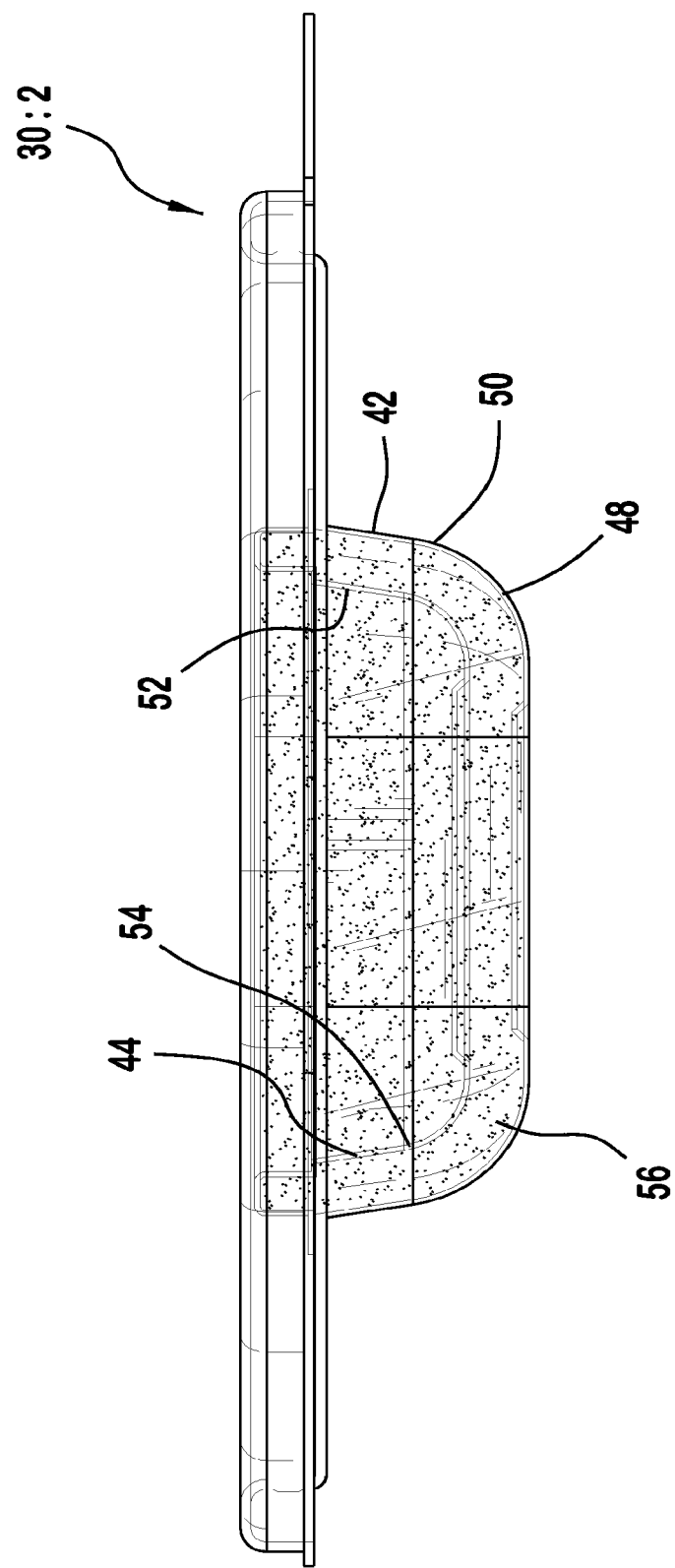
FIG. 4 is an elevational view of the food storage system of FIG. 3.
Figure 5:
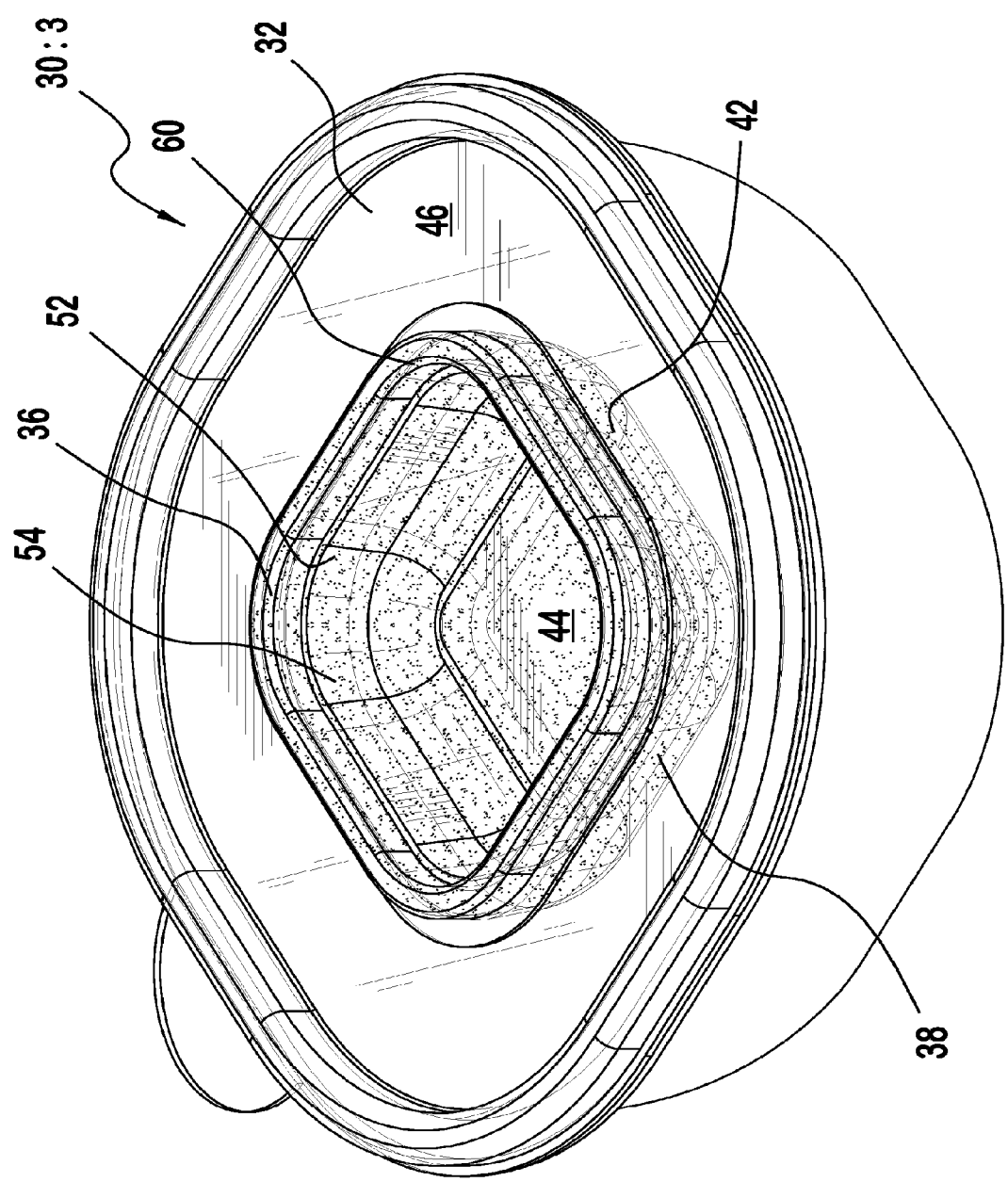
FIG. 5 is a perspective view of a third preferred embodiment of the food storage system of the present invention; the food storage system includes a main lid having a secondary bowl placed at least partially therein; the secondary bowl includes thermal energy storage material in the second bowl sidewall; the main lid and the secondary bowl are preferably generally rectilinearly shaped.
Figure 6:
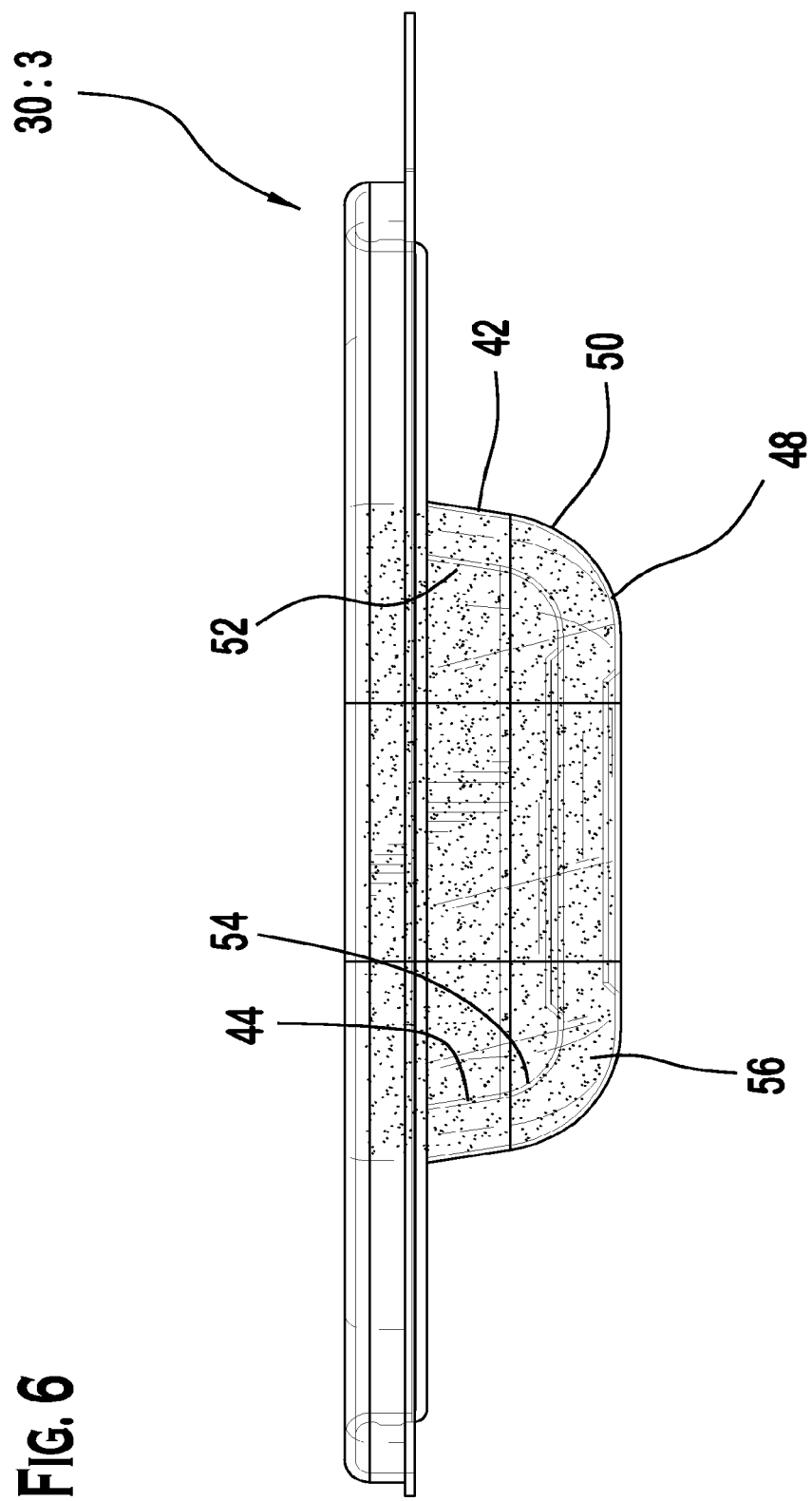
FIG. 6 is an elevational view of the food storage system of FIG. 5.
Figure 7:
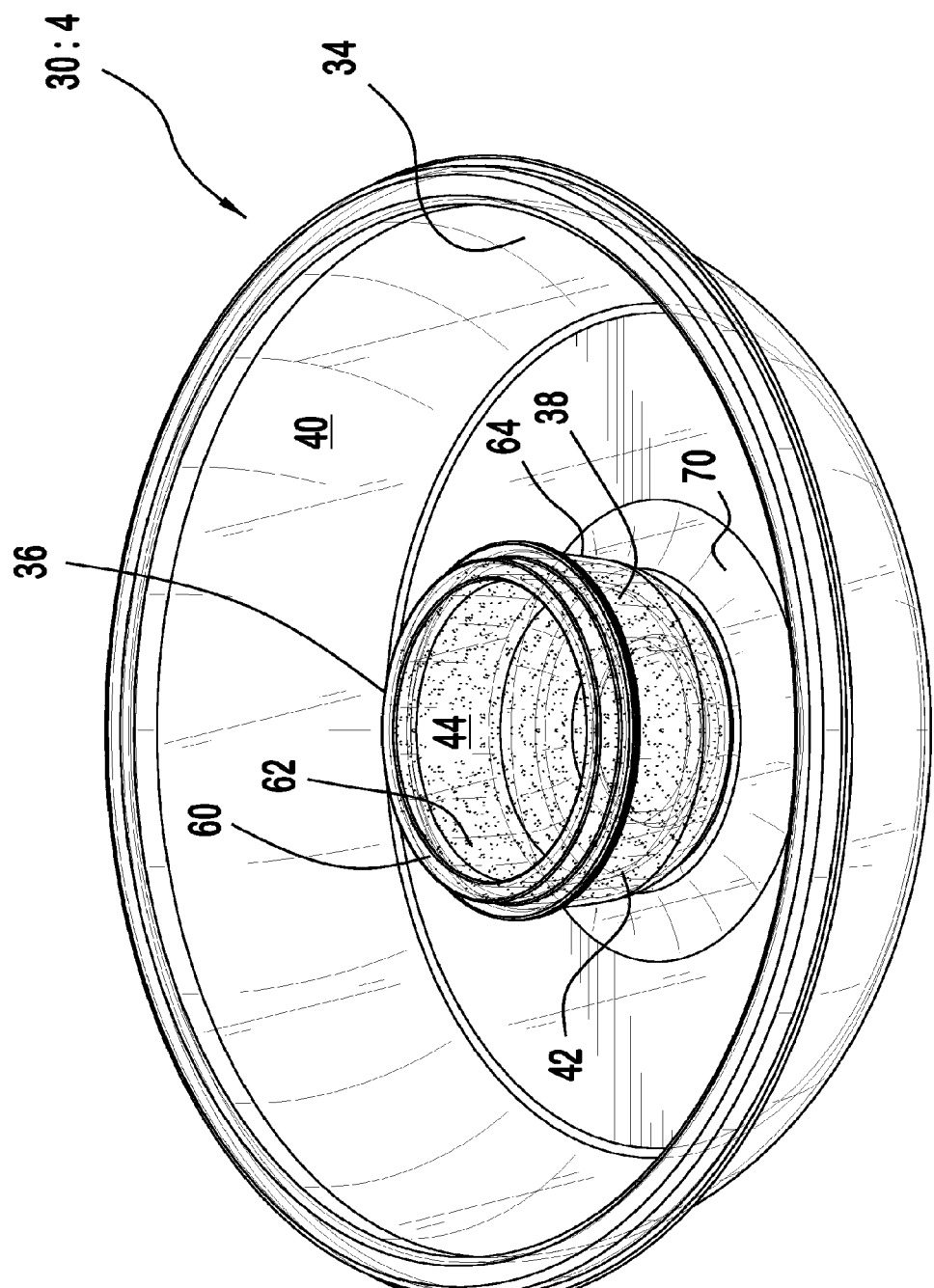
FIG. 7 is a perspective view of a fourth preferred embodiment of the food storage system of the present invention; the food storage system includes a main bowl with a secondary bowl located therein; the secondary bowl includes thermal energy storage material in the second bowl sidewall; the secondary bowl has a base perimeter that is received by a main bowl lip that defines an enclosed area for receiving the base of the secondary bowl therein; the main and secondary bowls generally have a circular shape.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the food storage system and designated parts thereof. The term "food" or "food item", as used in the claims and in the corresponding portions of the specification, is defined as including "one or both of liquid food (such as milk, water. Gatorade, soda or the like) and solid food (such as cookies, cereal, sandwiches, egg salad, or the like). The words "a" and "one" are defined as including one or more of the referenced item unless specifically stated otherwise. This terminology includes the words above specifically mentioned, derivatives thereof, and words of similar import.

Referring to FIGS. 1-21, wherein like numerals indicate like elements throughout, nine preferred embodiments of a food storage system are shown and designated 30:1-30:9 respectively. Briefly stated, the first through third embodiments of the food storage system 30:1-30:3 are directed to a main lid 32 that is adapted to detachably engage a main bowl 34. A secondary bowl 36 is positioned at least partially on and/or in the main lid 32. The secondary bowl 36 includes thermal energy storage material 38 therein. The fourth through eighth embodiments of the food storage 30:4-30:8 include a main bowl 34 having a secondary bowl 36 positioned therein with thermal energy storage material 38 located in the secondary bowl 36.

The main lid 32, the main bowl 34, and the secondary bowl 36, are preferably made of a polymeric material, such as polyethylene, polyethylene terephthalate (PET), polyvinyl chloride (PVC), polyphthalate carbonate (PPC), or any other suitable material.

Referring to FIGS. 1-6, the first through third embodiments of the food storage system 30:1-30:3 preferably, but not necessarily, include a main bowl 34 defining a first food receiving cavity 40. It is preferable that the main bowl 34 is generally translucent. While the bowls shown in the drawings are generally circular or rectangular in shape, those of ordinary skill in the art will appreciate that either the main or secondary bowls 34, 36 can be of any shape. For example, either of the main or secondary bowls 34, 36 can be irregularly shaped, shaped like a clam shell, shaped like a chili pepper, or have any other shape without departing from the scope of the present invention.

The main lid 32 is detachably engageable with the main bowl 34. The main lid 32 preferably has either a generally circular shape or a generally rectilinear shape. However, those of ordinary skill in the art will appreciate from this disclosure that the main lid 32 can have any shape without departing from the scope of the present invention. For example, the main lid 32 can be triangular, irregularly shaped or polygonally shaped, or the like without departing from the scope of the present invention. It is preferable, but not necessary that the main lid is generally translucent. Alternatively, the main lid can be opaque or can have various designs printed thereon.

Figure 20:
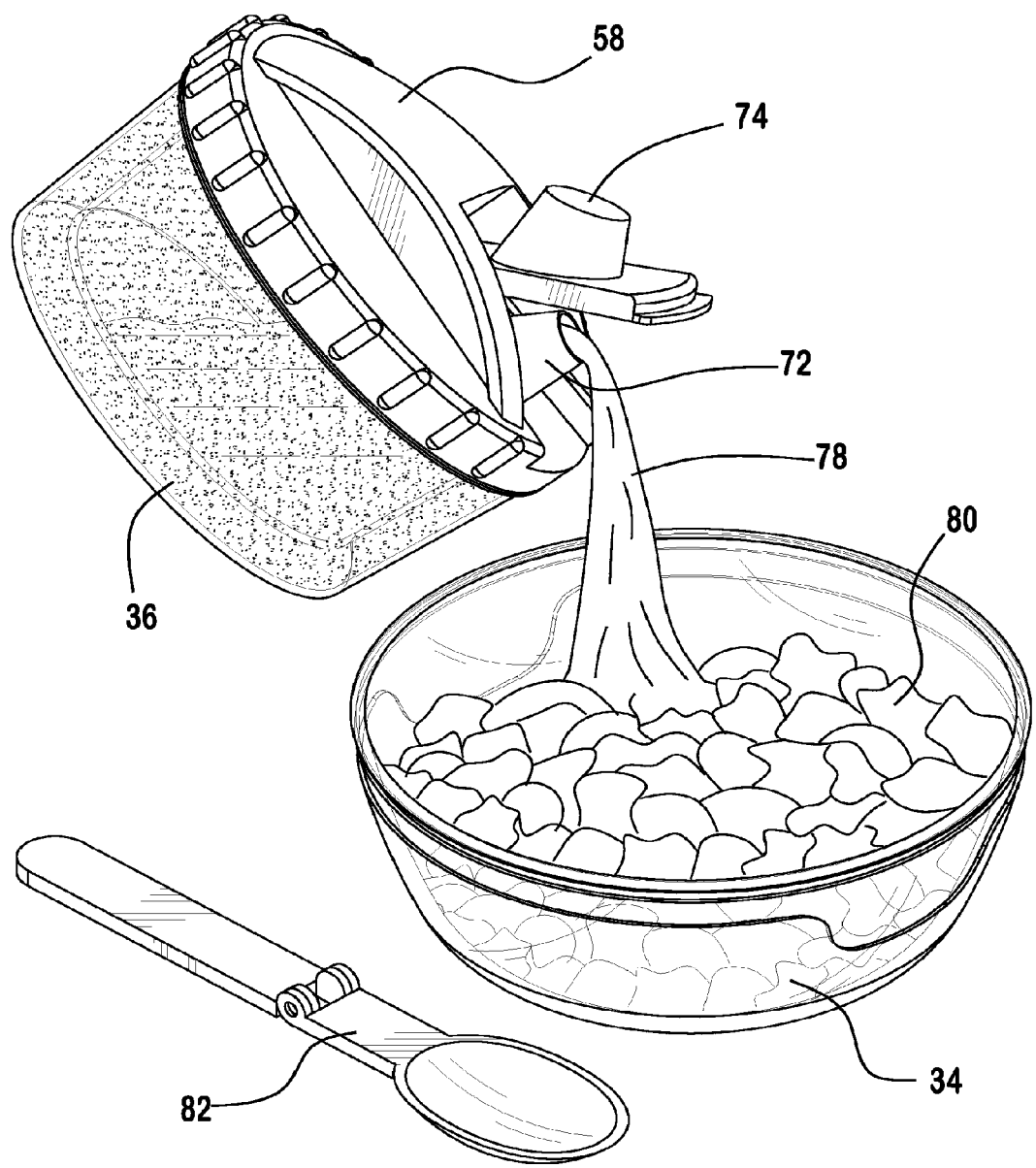
FIG. 20 is a perspective view of the food storage system of FIG. 18 illustrating the detached secondary bowl being used to dispense milk over cereal that is contained in the main bowl.

A secondary bowl 36 is positioned at least partially on and/or in the main lid 32. Referring to FIGS. 2A-2C, the secondary bowl 36 may be detachable from the main lid 32 as shown in FIGS. 18-21. For example, the secondary bowl 36 may be engaged with the main lid 32 via an interference fit. Alternatively, the secondary bowl 36 can be secured to the main lid 32 via a snap fit connection. Referring to FIGS. 19 and 20, the secondary bowl can be generally cylindrically shaped and received in a receiving groove 76 in the main lid 32.

Referring specifically to FIG. 2A, when the secondary bowl 36 is snap fit 43 to the main lid 32, a lip 43A extends generally around at least a portion of the secondary bowl 36. The outer diameter of the lip 43A is slightly larger than the corresponding inner diameter of the hole in the main lid 32. This causes the secondary bowl 36 to be detachably engaged with the main lid 32 when the secondary bowl 36 is pressed downwardly through the hole to form a snap fit connection 43.

Referring to FIG. 2B, when the secondary bowl 36 is threadably connected to the main lid 32, the secondary bowl includes at least one thread 45A at least partially therearound. The at least one thread 45A is engageable with another thread 45B on a downwardly depending lid member. As the secondary bowl 36 is screwed into the main lid 32, a threaded connection 45 is formed.

Referring to FIG. 2C, when the secondary bowl 36 is connected to the main lid 32 via a twist lock 47, a pin 47A is slid through a slot 47B and then turned into a recess 47C. This allows for quick engagement of the secondary bowl 36 and the main lid 32.

Referring again to FIGS. 1-6, the secondary bowl 36 includes a sidewall 42 containing a thermal energy storage material 38 therein. The thermal energy storage material 38 is preferably any suitable freezable and/or reheatable material, such as a refreezable gel or the like. It is preferred that the gel can undergo repeated cycles of freezing and thawing in order to provide cooling. Heat storing materials may also be utilized such that the thermal energy storage material 38 can be placed in a microwave oven to allow the thermal energy storage material 38 to provide warmth to food.

The sidewall 42 defines a second food receiving cavity 44. It is preferred, but not necessary that a portion of the main lid 32 form a portion of the sidewall 42 of the secondary bowl 36.

The main lid 32 may have a major surface 46 facing in a first direction generally away from the main bowl 34, when the main lid 32 is attached to thereto. The portion 48 of the main lid 32 preferably extends outwardly therefrom in a direction generally opposite to the first direction. The portion 48 of the main lid defines an outer wall 50 of the sidewall 42 of the secondary bowl 36.

It is also preferred that a panel 52 is shaped to be generally coextensive with the portion 48 of the main lid 32 forming the outer wall 50 and is attached to the main lid 32 to form an inner wall 54 of the secondary bowl 36. The inner wall 52 defines a food receiving surface for the second food receiving cavity 44 and is generally spaced from the outer wall 50 to define a chamber 56 therebetween.

It is preferable that the thermal energy storage material 38 is located within the chamber 56. It is also preferable that the thermal energy storage material 38 is a gel. The gel may be colored or translucent depending on the particular esthetic look desired. It is preferred that the inner wall 54 is welded to the main lid 32. Alternatively, the inner wall 54 may be secured to the main lid via an adhesive, or by any other known method of securing two components of a food storage system.

The food storage system 30:1-30:3 can separately hold food items in the first or second food receiving cavities 40, 44. The secondary bowl 36 is configured so that the thermal energy storage material 38 can heat/or cool food contained in the second food receiving cavity 44. It is preferred that the secondary bowl 36 is generally translucent so that the secondary bowl 36 has a color of the thermal energy storage material 38 therein.

When both the main bowl 34 and the secondary bowl 36 are generally translucent, the entire food storage system 30:1-30:3 takes on the general color of the thermal energy storage material 38. This allows for attractive decorative options. It is preferred that the secondary bowl 36 is generally centered in the main bowl 34.

The food storage system 30:1-30:3 may include a secondary lid 58 that is detachably engageable with the secondary bowl 36. It is preferable that the secondary bowl 36 include an upper rim 60 for engaging the secondary lid 58. The secondary bowl 36 is preferably located so that the upper rim 60 is substantially adjacent to the major surface 46 of the main lid 32. The major surface 46 preferably faces generally away from the main bowl 34 when the main lid 32 is attached thereto.

Referring to FIGS. 7-16, the fourth through eighth embodiments of the food storage system 30:4-30:8 of the present invention are shown. The food storage system 30:4-30:8 includes the main bowl 34 which defines the first food receiving cavity 40.

The food storage system 30:4-30:8 includes the secondary bowl 36 positioned in the first food receiving cavity 40. It is preferable, but not necessary, that the secondary bowl 36 is generally centrally positioned within the main bowl 34. The secondary bowl 36 includes a sidewall 42 containing thermal energy storage material 38 therein.

It is preferred that the sidewall 42 is formed by inner and outer panels 62, 64. The inner panel 62 defines the second food receiving cavity 44. The outer panel 64 is preferably integrally formed with the main bowl 34. It is preferred that the inner panel 62 defines the upper rim 60 for engaging the secondary lid 58. The inner panel 62 is generally coextensive with and spaced from the outer panel 64.

It is preferred that the main bowl 34 is generally translucent. It is also preferred that the secondary bowl 36 is generally translucent so that the main and secondary bowls 34, 36 have the general color of the thermal energy storage material 38. Alternatively, the secondary bowl 36 can be the only bowl that is generally translucent so that the secondary bowl 36 has the color of the thermal energy storage material 38, but the main bowl 34 does not.

The food storage system 30:4-30:8 can separately hold food items in the first or second food receiving food receiving cavities 40,44. The secondary bowl 36 is configured so that the thermal energy storage material 38 can heat and/or cool food contained in the food receiving cavity 44. The secondary bowl 36 is securable in a fixed position within the first food receiving cavity 40 when the main and secondary bowls are covered.

Figure 8:
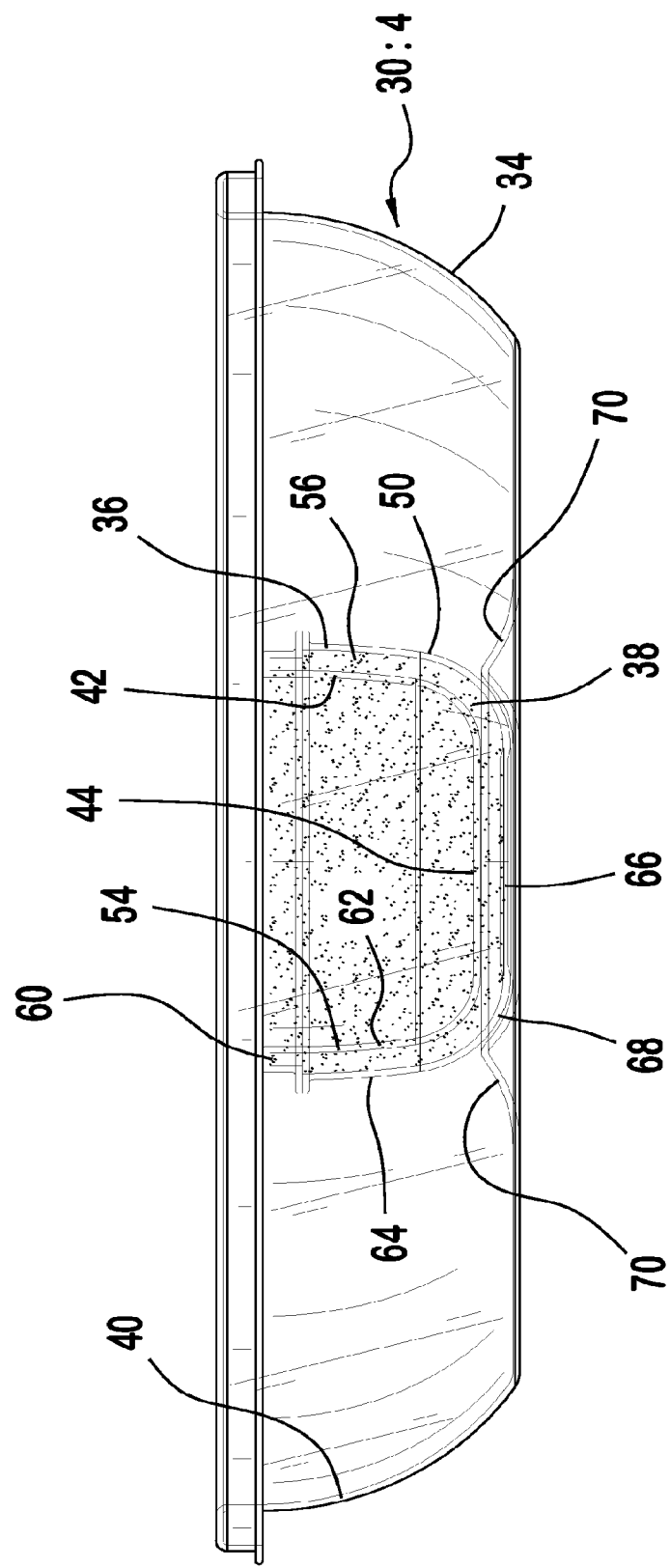
FIG. 8 is an elevational view of the food storage system of FIG. 7.

It is preferred, but not necessary, that the main and secondary bowls 34, 36 are fixedly attached to each other. Referring to FIG. 8, the secondary bowl 36 includes a secondary bowl base 66 having a base perimeter 68. The main bowl 34 preferably includes a lip 70 extending from the first food receiving cavity 40 and configured to define an enclosed area for receiving the base 66 of the secondary bowl 36 therein. The secondary bowl 36 may be detachable from the main bowl 34 for heating and cooling the thermal energy storage material 38 therein. This allows the secondary bowl to be heated or chilled while the main bowl 34 is in use.

Figure 8A:
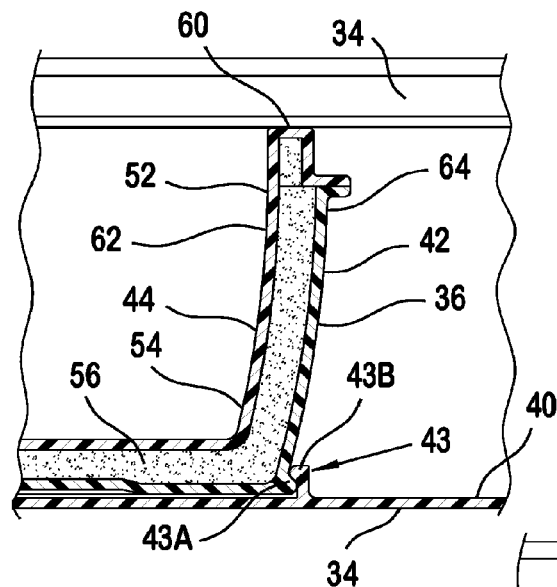
FIG. 8A is a partial cross-sectional view of the food storage system of FIG. 8 and illustrates the secondary bowl being snap fit to the main bowl; a lip extends around the secondary bowl that is pressed past a constricting member on the main bowl to allow the secondary bowl to be detachably engageable with the main bowl.
Figure 8B:
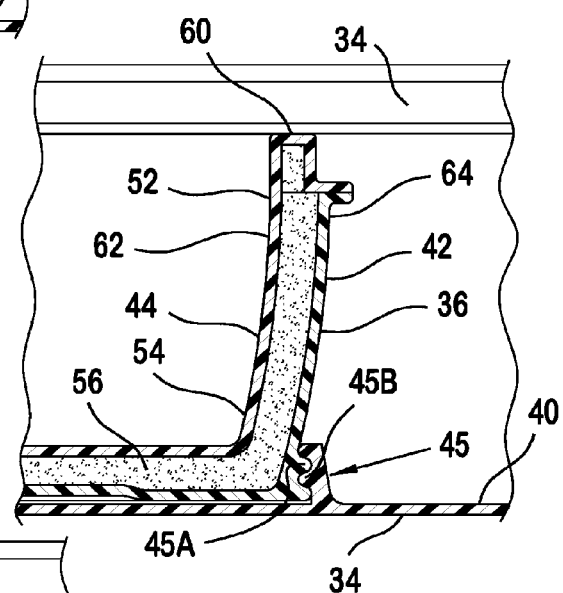
FIG. 8B is a partial cross-sectional view of the food storage system of FIG. 8 and illustrates the secondary bowl being threaded to the main bowl; at least one thread extends around the secondary bowl that is detachably engageable with at least one thread that is positioned along an upwardly depending main bowl member.
Figure 8C:
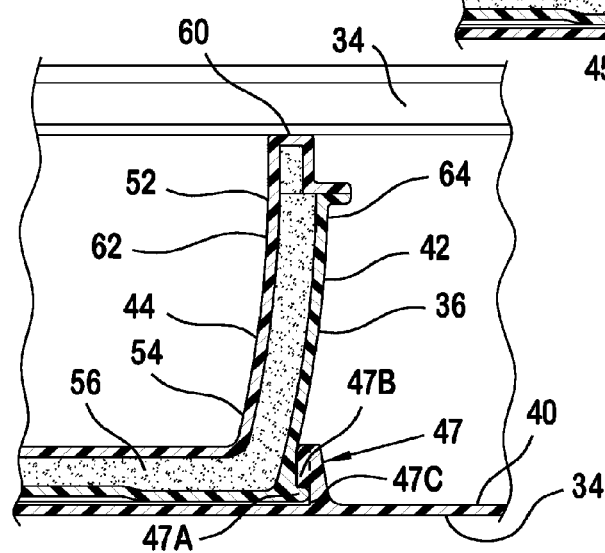
FIG. 8C is a partial cross-sectional view of the food storage system of FIG. 8 and illustrates the secondary bowl being twist locked to the main bowl; a lip extends around the secondary bowl that is slid through a slot and then rotated to detachably secure the secondary bowl to the main bowl.
Figure 9:
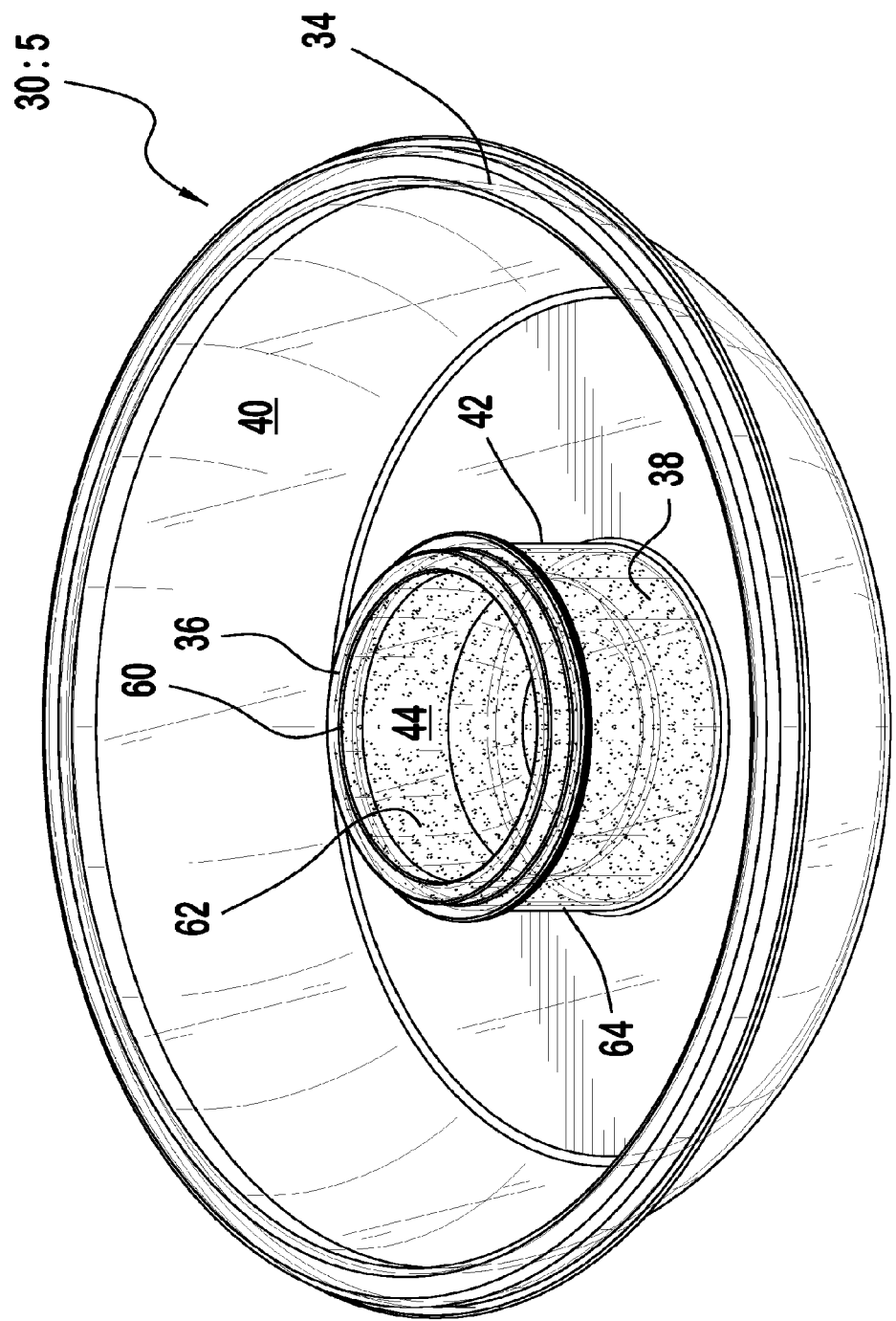
FIG. 9 is perspective view the fifth preferred embodiment of the food storage system of the present invention; the food storage system includes a main bowl and a secondary bowl containing thermal energy storage material therein; the secondary bowl sidewall is formed by inner and outer panels with the inner panel defining the second food receiving cavity; the outer panel is integrally formed with the main bowl; the main and secondary bowls have a generally circular shape.
Figure 10:
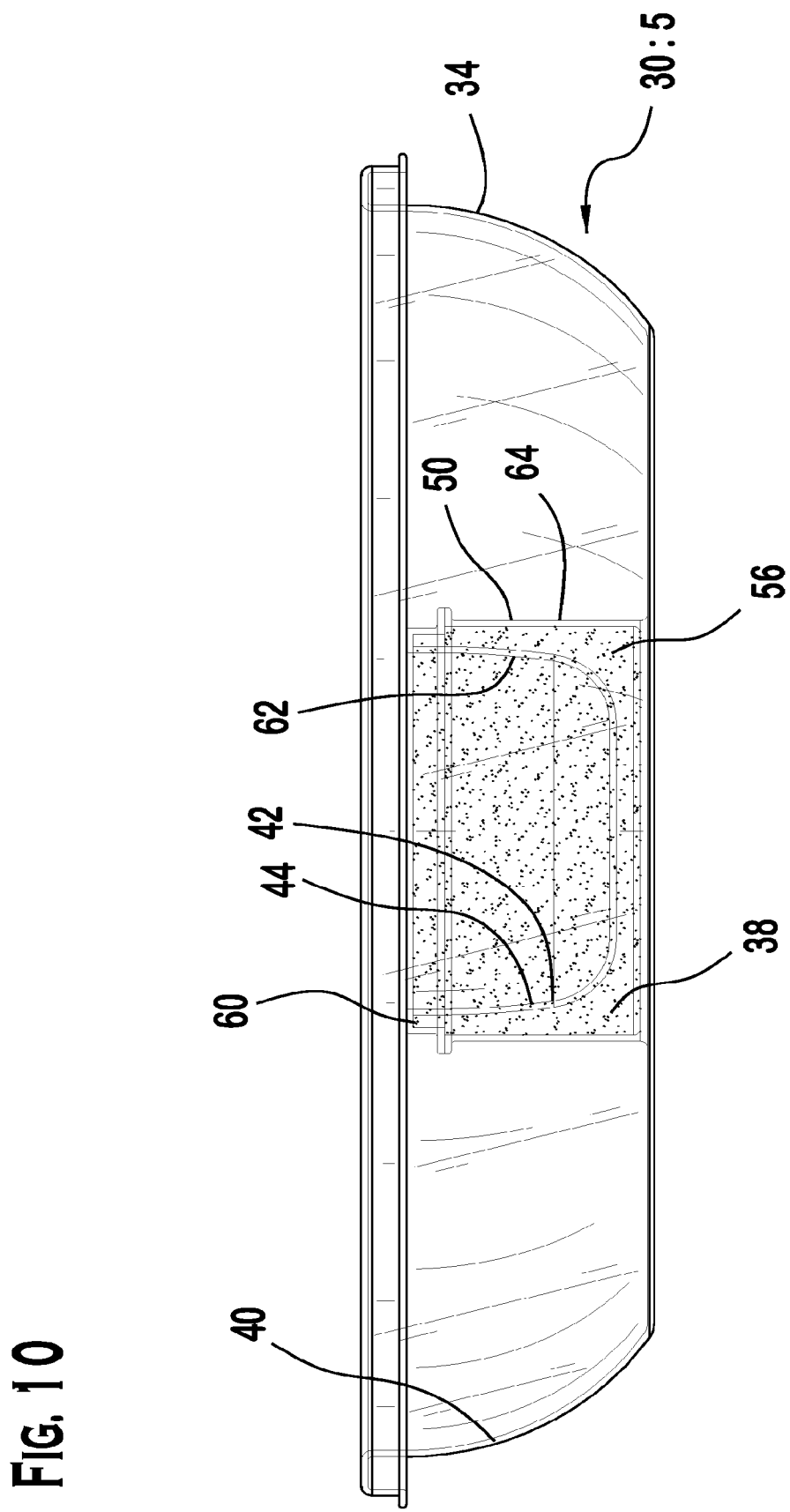
FIG. 10 is an elevational view of the food storage system of FIG. 9.
Figure 11:
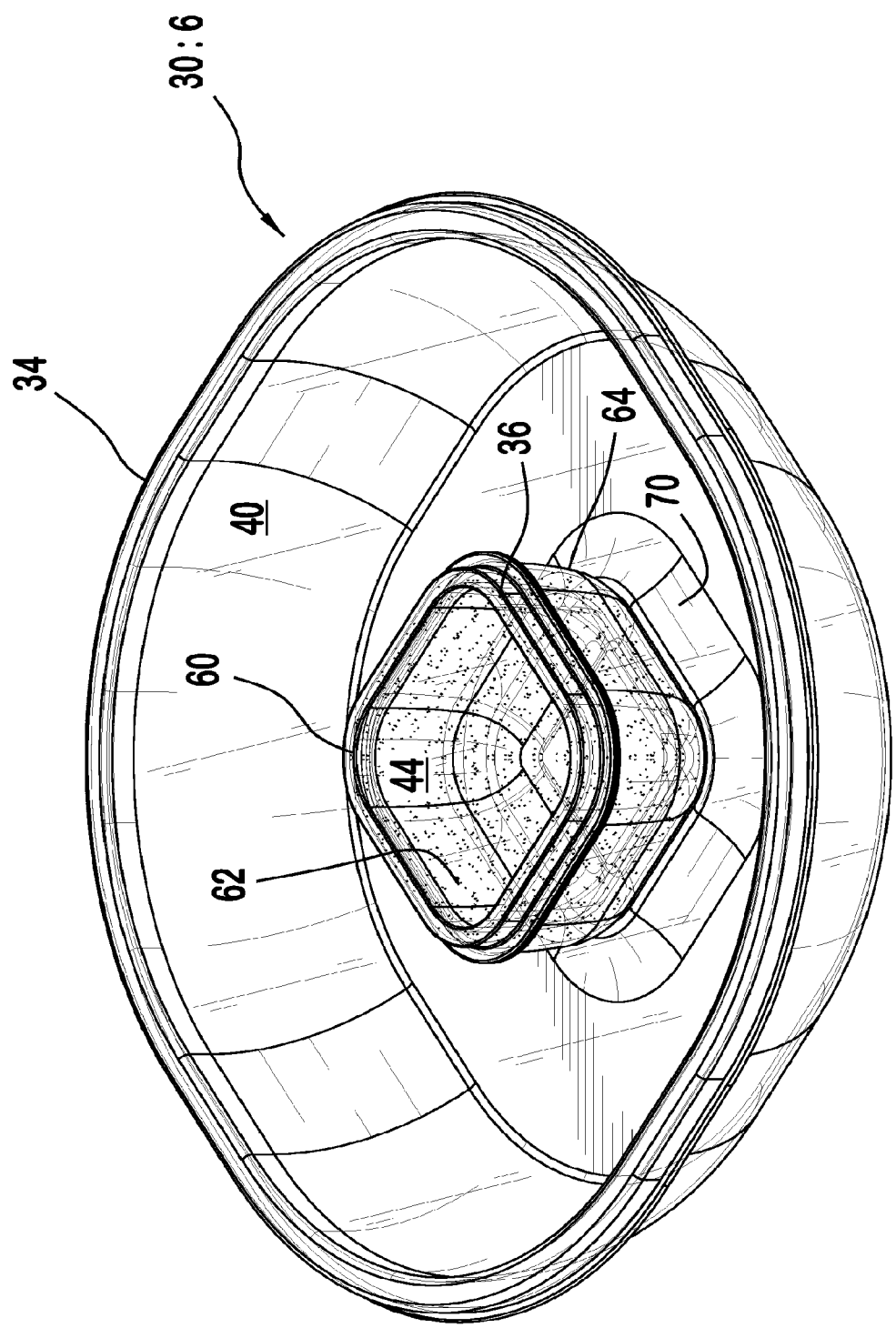
FIG. 11 is a perspective view of a sixth preferred embodiment of the food storage system of the present invention; the food storage system includes main and secondary bowls each having a generally rectilinear shape; the secondary bowl includes thermal energy storage material therein; the secondary bowl has a base perimeter and the main bowl includes a lip extending from the first receiving cavity and configured to define an enclosed area for receiving the base of the secondary bowl therein.
Figure 12:
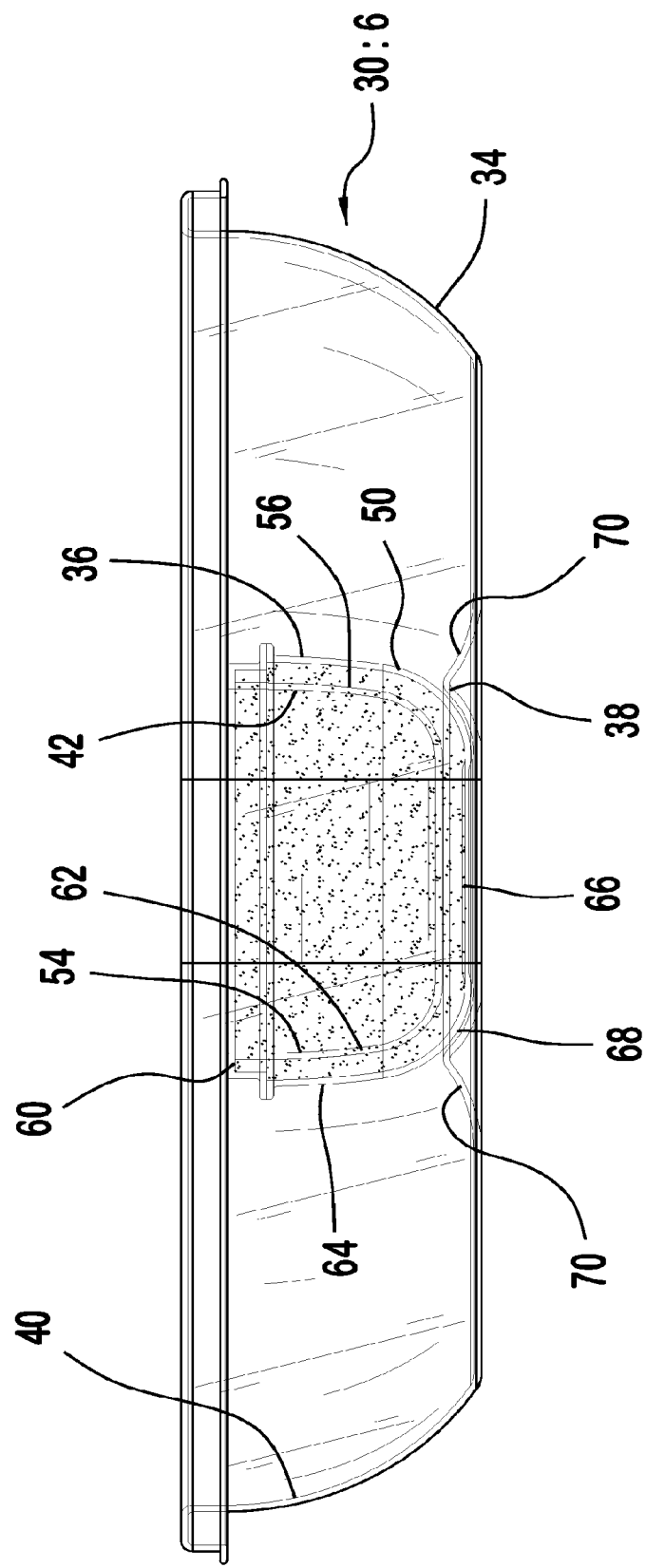
FIG. 12 is an elevational view of the food storage system of FIG. 11.
Figure 13:
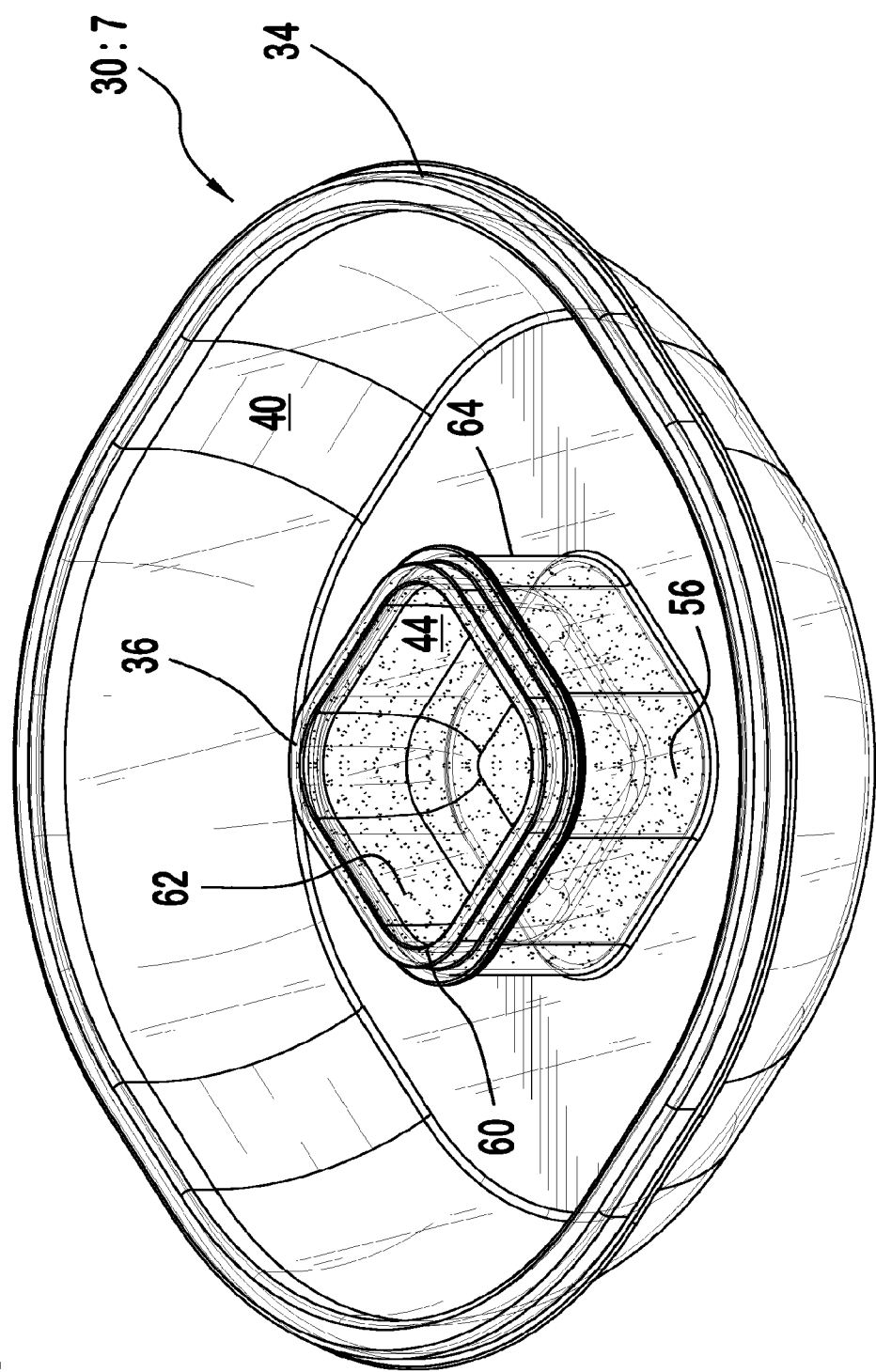
FIG. 13 is a perspective view of a seventh preferred embodiment of the food storage system of the present invention; the food storage system includes main and secondary bowls having a generally rectilinear shape with the outer panel of the secondary bowl being integrally formed with the main bowl; the secondary bowl includes thermal energy storage material therein.
Figure 14:
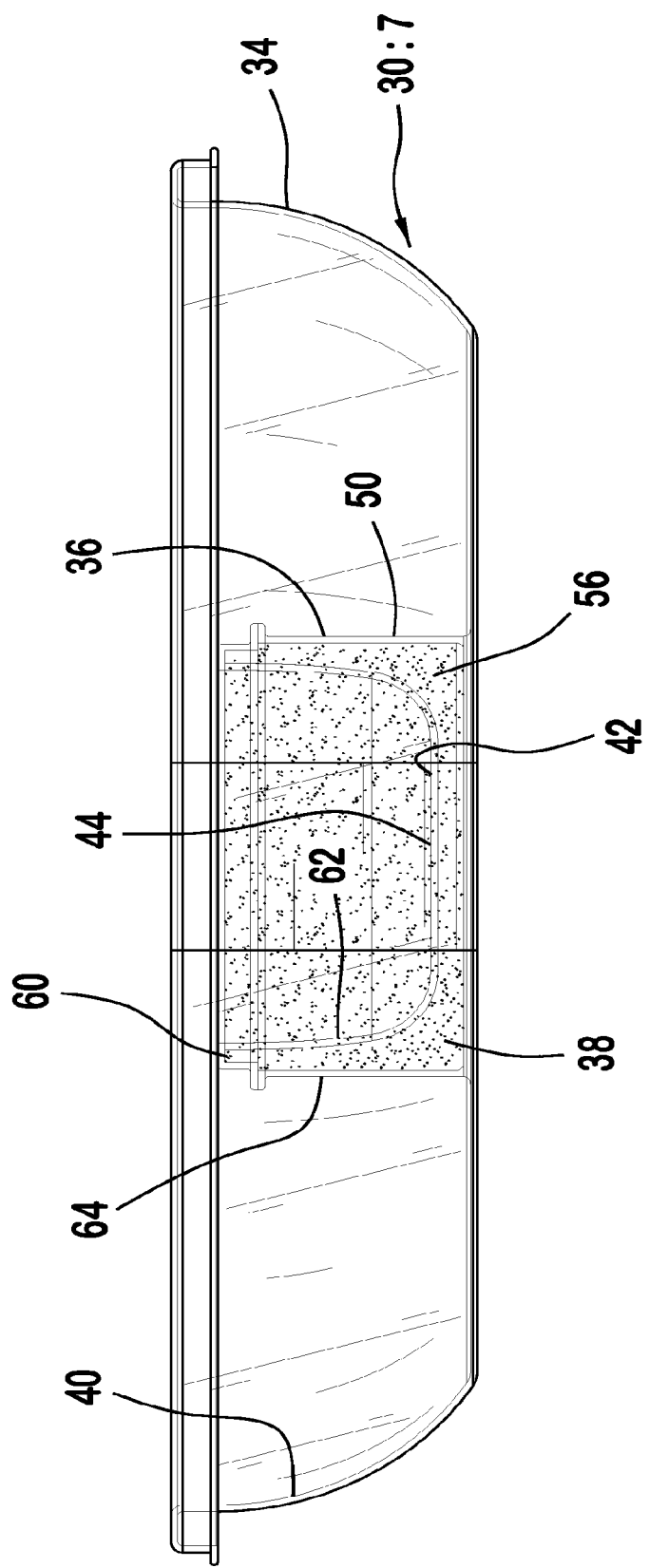
FIG. 14 is an elevational view of the food storage system of FIG. 13.
Figure 15:
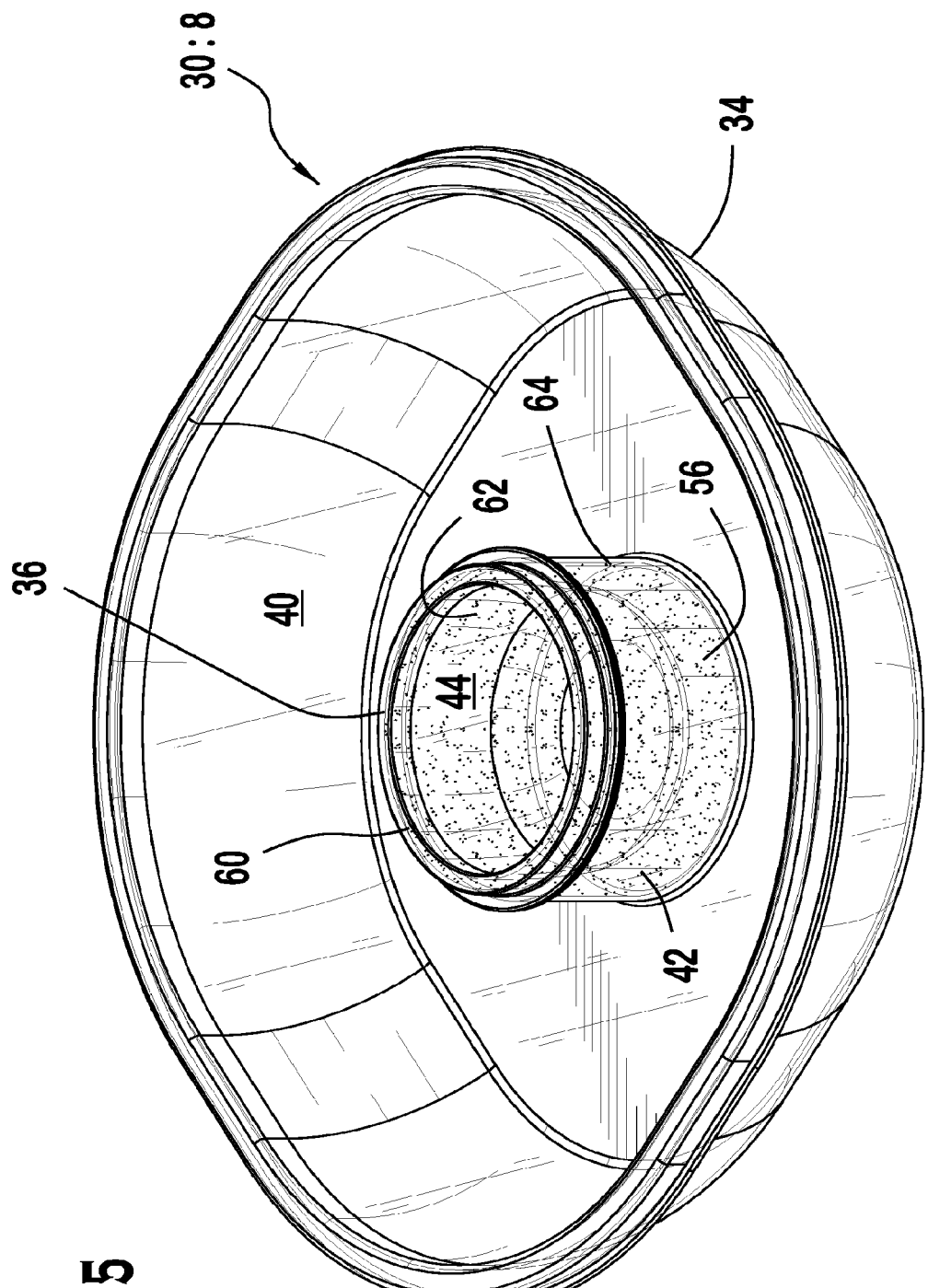
FIG. 15 is an eighth perspective view of an eighth preferred embodiment of the food storage system of the present invention; the food storage system included a main bowl having a generally rectilinear shape and a secondary bowl having a generally circular shape; the secondary bowl has thermal energy storage material in a sidewall thereof; the outer panel of the sidewall of the secondary wall is integrally formed with the main bowl.
Figure 16:
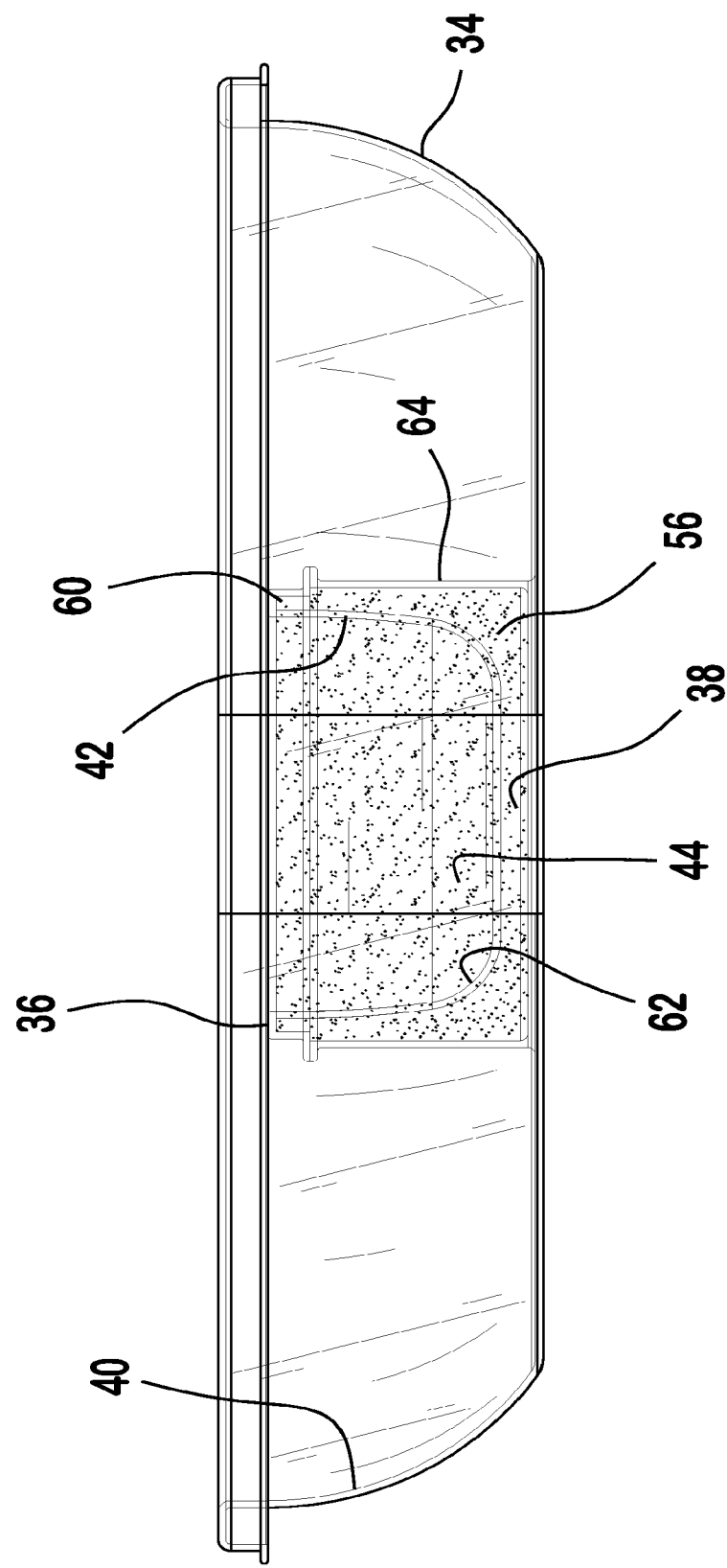
FIG. 16 is a elevational view of the food storage system of FIG. 15.

Referring to FIGS. 8A-8C, when the secondary bowl 36 is detachably engaged with the main bowl 34, it is preferred that the secondary bowl 36 is secured to the main bowl via a twist lock connection. Alternatively, the secondary bowl 36 may be connected to the main bowl 34 via a snap fit connection or a threaded connection. Furthermore, the secondary bowl 36 may be detachably secured to the main bowl 34 using any known means, such as hook and loop material or the like without departing from the scope of the present invention.

Referring specifically to FIG. 8A, when the secondary bowl 36 is snap fit 43 to the main bowl 34, a lip 43A extends generally around at least a portion of the secondary bowl 36. The outer diameter of the lip 43A is slightly larger than the corresponding inner diameter of a constricting member 43B located on the main bowl 34. This causes the secondary bowl 36 to be detachably engaged with the main bowl 34 when the secondary bowl 36 is pressed downwardly through the constricting member 43B to form a snap fit connection 43.

Referring to FIG. 8B, when the secondary bowl 36 is threadably connected to the main bowl 34, the secondary bowl includes at least one thread 45A at least partially therearound. The at least one thread 45A is engageable with another thread 45B on a upwardly depending main bowl member 45B. As the secondary bowl 36 is screwed into the main bowl 34, a threaded connection 45 is formed.

Referring to FIG. 8C, when the secondary bowl 36 is connected to the main bowl 34 via a twist lock 47, a pin 47A is slid through a slot 47B and then turned into a recess 47C. This allows for quick engagement of the secondary bowl 36 and the main bowl 34.

Figure 17:
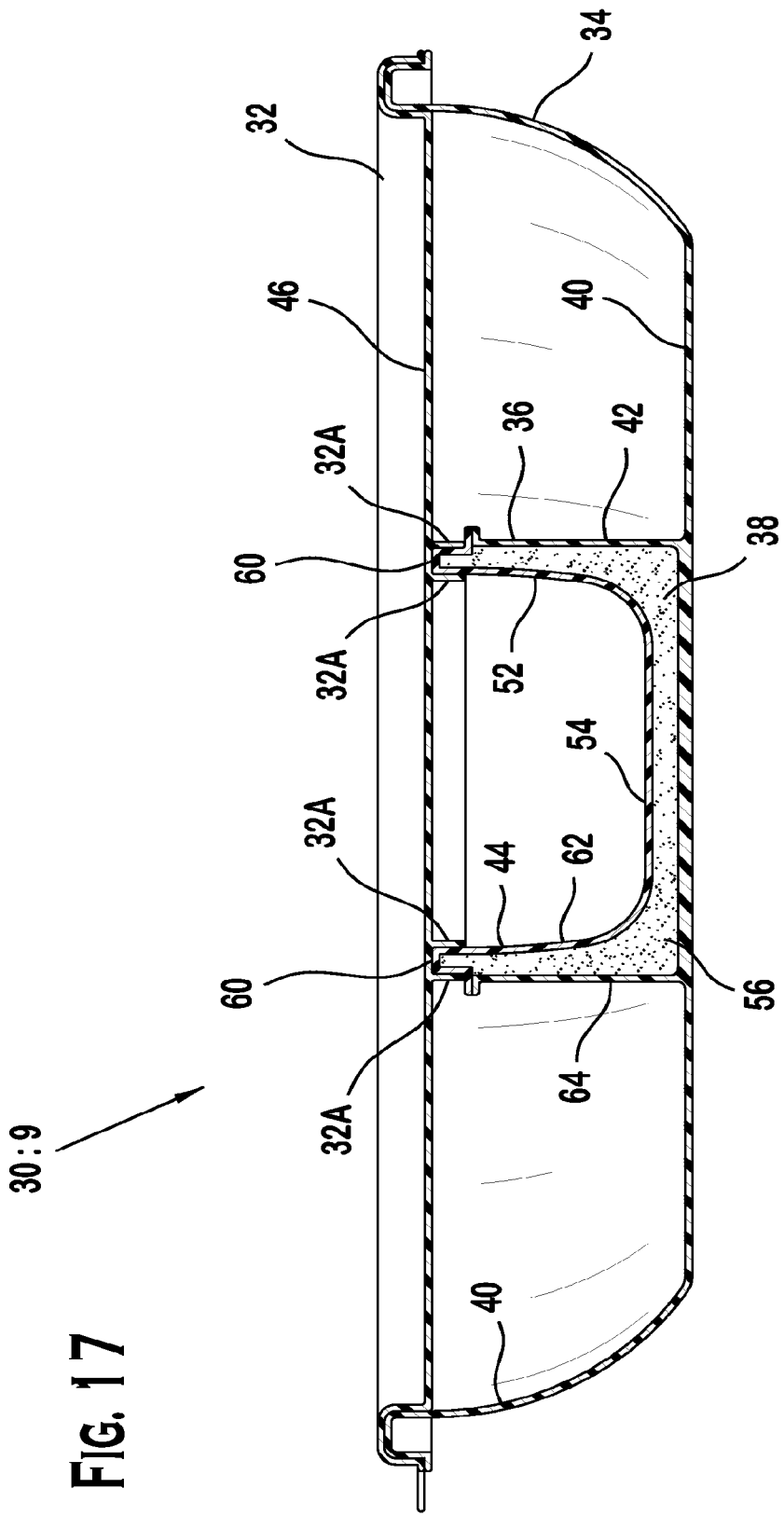
FIG. 17 is a cross-sectional view of a ninth preferred embodiment of the food storage system of the present invention, illustrating a single lid capable of simultaneously sealing the main and secondary bowls; annular projections extend downwardly toward the secondary bowl to create a seal between the main lid and the upper rim of the secondary bow.
Figure 18:
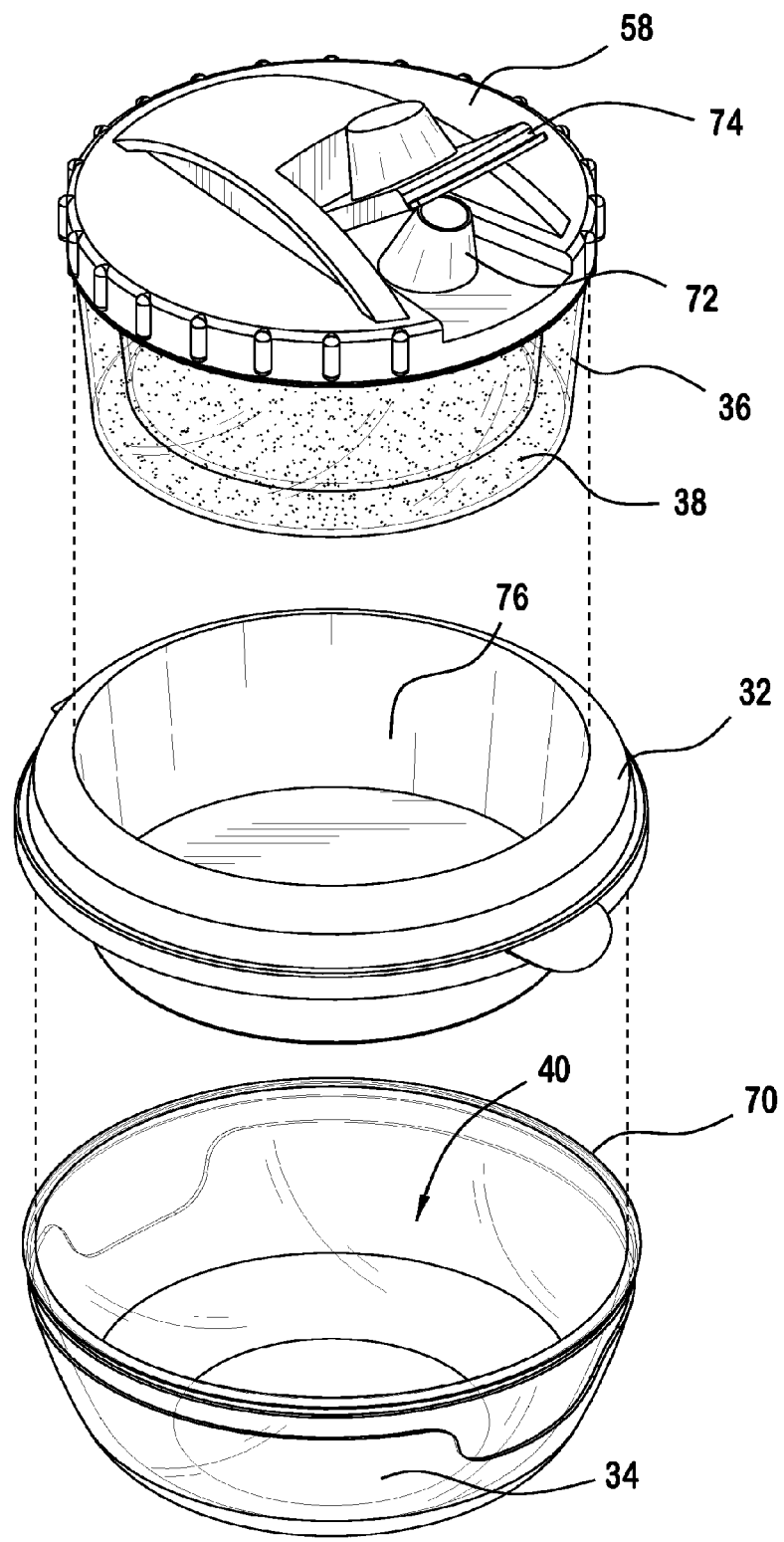
FIG. 18 is an exploded view of a tenth preferred embodiment of the food storage system of the present invention illustrating a secondary bowl that is detachable from the main lid; The secondary bowl preferably includes thermal energy storage material in its sidewall; The secondary bowl can be completely detached from the main lid for separate cooling and/or heating prior to transport; The main lid is preferably snap fit to the main bowl.

Referring to FIG. 17, it is preferred, but not necessary, that the main and secondary bowls 34, 36 are sealed using a single lid 32. When a single lid 32 is used, the single lid 32 includes downwardly projecting grooves 32A that form a seal with the upper rim 60 of the secondary bowl 36. Alternatively, the food storage system 30:4-30:8 can include main and secondary lids 32, 58. The secondary lid 58 may be detachably engageable with the secondary bowl 36. The main lid 32 is preferably detachably engageable with the main bowl 34. The food storage system 30:4-30:8 is preferably configured so that, when the secondary lid 58 is engaged with the secondary bowl 36 and the main lid 32 is engaged with the main bowl 34, that the main lid 32 braces the secondary lid 58 in position. It is preferred that the secondary lid 58 is decoratively shaped with a perimeter representing an animal face.

Referring to FIGS. 1-6, one embodiment of the present invention operates as follows. A food storage system 30:1-30:3 can be used to store chips and salsa for transportation. The chips are placed in the main bowl 34 in the first food receiving cavity 40. Then, the main lid 32 is attached to the main bowl 34 to secure the chips therein. The main lid 32 is preferably refrigerated or frozen prior to attachment so that the thermal energy storage material 38 in the secondary bowl 36 provides cooling to any food in the second food receiving cavity 44. The salsa dip is placed in the second food receiving cavity 44 and sealed with the secondary lid 58. Thus packaged, the chips and salsa are ready for transport and later consumption thereof.

Referring to FIGS. 7-16 and 20, the fourth through eighth embodiments of the food storage system 30:4-30:8 of the present invention operate as follows. Cookies or cereal 80 are positioned the first food receiving cavity 40 but outside of the secondary bowl 36. Then, milk 78 is poured into the secondary bowl 36. The secondary bowl is preferably refrigerated or frozen prior to use so that the thermal energy storing material 38 keeps the milk in a chilled state. Than at least one cover is placed over the secondary bowl or over both the secondary bowl 36 and the main bowl 34. Then the food storage system 30:4-30:8 is ready for transportation and later consumption of the milk and cookies or cereal.

Referring to FIGS. 18-21 a ninth embodiment of the food storage system is shown. The secondary bowl 36 is preferably detachably engageable with the main lid 32. The main lid 32 may be configured to include a groove 76 for receiving the secondary bowl 36 to form an interference fit as shown in FIG. 21. The secondary lid 58 may include a spout 72 and moveable closure element 74 adapted to seal the spout and prevent the pouring of fluid While various shapes, configurations, uses, and features have been described above and are shown in the drawings for the various embodiments of the present invention, those of ordinary skill in the art will appreciate from this disclosure that any combination of the above features can be used without departing from the scope of the present invention. Accordingly, it is recognized by those skilled in the art that changes may be made to the above described embodiments of the invention without departing from the broad inventive concept thereof. It is understood, therefore, that this invention is not limited to the particular embodiments disclosed, but it is intended to cover all modifications which are within the spirit and scope of the invention as defined by the appended claims and/or shown in the attached drawings.

What is claimed is:

1. A food storage system, comprising: a main bowl defining a first food receiving cavity; a main lid detachably engageable with the main bowl; a secondary bowl positioned at least partially or in the main lid, the secondary bowl is detachable from the main lid, wherein the secondary bowl includes thermal energy storage material therein and defines a second food receiving cavity, wherein the food storage system can separately hold food items in the first or second food receiving cavities, the secondary bowl being configured so that the thermal energy storage material can heat or cool food contained in the second food receiving cavity.

2. The food storage system of claim 1, wherein the secondary bowl is engaged with the main lid via an interference fit.

3. The food storage system of claim 1, wherein the secondary bowl is secured to the main lid via a snap fit connection.

4. The food storage system of claim 1, wherein the secondary bowl includes an upper rim for engaging a secondary lid, the secondary bowl being located so that the upper rim is substantially adjacent to a major surface of the main lid, the major surface facing generally away from the main bowl when the main lid is attached thereto.

5. The food storage system of claim 1, wherein the thermal energy storage material is a gel.

6. The food storage material of claim 1, wherein the main lid is generally translucent.

7. The food storage material of claim 6, wherein the main bowl is generally translucent.

8. The food storage material of claim 1, wherein the secondary bowl is generally translucent so that the secondary bowl has a color of the thermal energy storage material.

9. The food storage system of claim 1, wherein the secondary bowl is generally centered in the main bowl.

10. The food storage system of claim 1, wherein the main bowl contains cereal and the secondary bowl contains milk.

11. A food storage system, comprising: a main lid adapted for detachable engagement with a main bowl having a first food receiving cavity; a secondary bowl positioned at least partially or in the main lid, the secondary bowl is detachable from the main lid, wherein the secondary bowl includes thermal energy storage material therein and defines a second food receiving cavity, wherein the food storage system is adapted to hold food items in the second food receiving cavity, the secondary bowl being configured so that the thermal energy storage material is adapted to heat or cool food contained in the second food receiving cavity.

12. The food storage system of claim 11, wherein the secondary bowl is engaged with the main lid via an interference fit.

13. The food storage system of claim 11, wherein the secondary bowl is secured to the main lid via a snap fit connection.

14. The food storage system of claim 11, wherein the secondary bowl includes an upper rim for engaging a secondary lid, the secondary bowl being located so that the upper rim is substantially adjacent to a major surface of the main lid, the major surface facing generally away from the main bowl when the main lid is attached thereto.

15. The food storage system of claim 11, wherein the thermal energy storage material is a gel.

16. The food storage material of claim 11, wherein the main lid is generally translucent.

17. The food storage material of claim 11, wherein the secondary bowl is generally translucent so that the secondary bowl has a color of the thermal energy storage material.

18. A food storage system, comprising: a main bowl defining a first food receiving cavity; a main lid detachably engageable with the main bowl; a secondary bowl positioned at least partially or in the main lid, the secondary bowl is detachable from the main lid, wherein the secondary bowl includes thermal energy storage material therein and defines a second food receiving cavity, wherein the food storage system is adapted to hold food items in the second food receiving cavity, the secondary bowl being configured so that the thermal energy storage material is adapted to heat or cool food contained in the second food receiving cavity; and wherein the food storage system can separately hold food items in the first and second food receiving cavities.

\* \* \* \* \*